United States Patent [19]

Lepert

[11] 4,078,132

[45] Mar. 7, 1978

[54] "PROCESS FOR PREPARING PETROLEUM RESINS HAVING LOW SOFTENING POINTS AND NARROW MOLECULAR WEIGHT RANGES"

[76] Inventor: Andre Lepert, des Mouettes 21B/1640 Rhode-Saint-Genese, Belgium

[21] Appl. No.: 712,537

[22] Filed: Aug. 9, 1976

[30] Foreign Application Priority Data

Aug. 13, 1975 United Kingdom .............. 33705/75

[51] Int. Cl.$^2$ ........................... C08F 2/00; C08F 4/00; C08F 4/42; C08F 240/00
[52] U.S. Cl. .............. 526/76; 260/28.5 AV; 260/28.5 B; 260/888; 260/889; 526/82; 526/89; 526/90; 526/191; 526/204; 526/206; 526/209; 526/212; 526/237; 526/238; 526/290
[58] Field of Search ..................... 526/76, 89, 82, 290, 526/237, 238, 206, 209, 501

[56] References Cited

U.S. PATENT DOCUMENTS

| | | | |
|---|---|---|---|
| 2,521,432 | 9/1950 | Walsh et al. ........................... 526/82 |
| 2,734,046 | 2/1956 | Nelson et al. ........................... 526/76 |
| 2,849,512 | 8/1958 | Banes et al. ........................... 526/290 |
| 2,856,389 | 10/1958 | Fusco et al. ........................... 526/290 |
| 2,894,937 | 7/1959 | Banes et al. ........................... 526/76 |
| 2,964,504 | 12/1960 | Leary et al. ........................... 526/290 |
| 2,994,689 | 8/1961 | Banes et al. ........................... 526/76 |
| 3,505,300 | 4/1970 | Galloway ............................. 528/500 |
| 3,577,398 | 5/1971 | Pace et al. ............................. 260/879 |
| 3,692,756 | 9/1972 | Cyr ............................................. 260/5 |
| 3,709,854 | 1/1973 | Hepworth et al. ................... 526/290 |
| 3,817,953 | 6/1974 | Younger ................................ 526/237 |
| 3,865,797 | 2/1975 | Joy ........................................ 526/76 |
| 3,905,948 | 9/1975 | Vargiv et al. ........................... 526/76 |
| 3,987,123 | 10/1976 | Lepert ................................... 526/76 |

FOREIGN PATENT DOCUMENTS

| | | |
|---|---|---|
| 102,154 | 4/1974 | Japan. |
| 71,679 | 3/1974 | Japan. |
| 42,768 | 3/1972 | United Kingdom. |
| 45,333 | 4/1974 | United Kingdom. |

*Primary Examiner*—Herbert J. Lilling
*Attorney, Agent, or Firm*—Rebecca Yablonsky

[57] ABSTRACT

Low softening point resins are prepared by a process which comprises polymerising using a Friedel Crafts catalyst:

(1) a petroleum resin feed comprising $C_5$ olefins and $C_5$ diolefins or a mixture of $C_5$ and $C_6$ olefins and diolefins, said feed being obtained from the cracking of petroleum feedstock and being subjected to thermal soaking at a temperature of 100° C to 150° C, and (2) a branched chain reactive aliphatic olefin or an oxygenated transfer agent.

Preferred additives are diisobutene or U.O.P. olefins. The polymerization may take place in the presence of a $C_8$ to $C_{10}$ unsaturated aromatic compound.

15 Claims, 1 Drawing Figure

Figure 1:
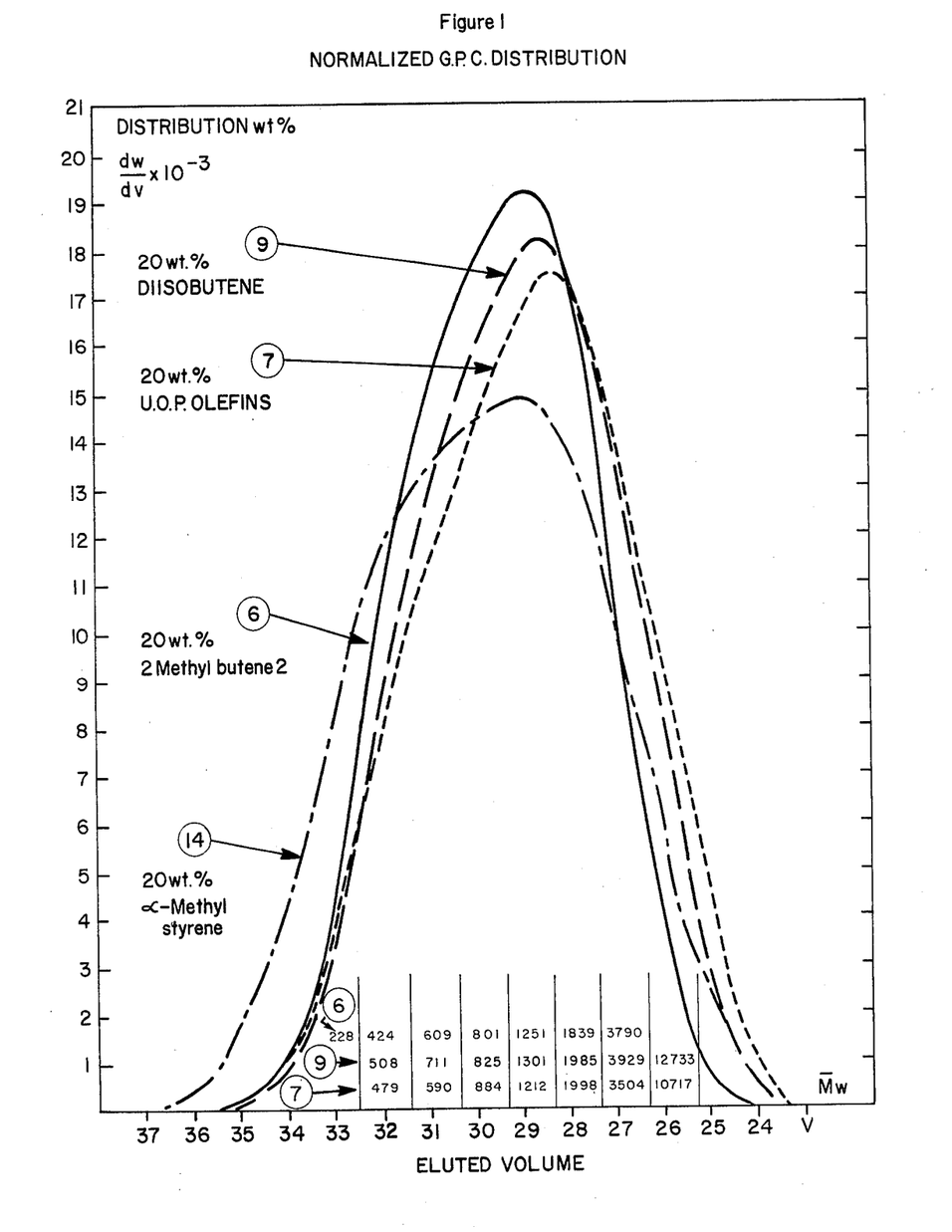

Figure 1
NORMALIZED G.P.C. DISTRIBUTION

"PROCESS FOR PREPARING PETROLEUM RESINS HAVING LOW SOFTENING POINTS AND NARROW MOLECULAR WEIGHT RANGES"

This invention relates to a process for the preparation of low softening point hydrocarbon resins.

According to this invention low softening point resins are obtained by a process which comprises polymerising using a Friedel Crafts catalyst :

(1) a petroleum resin feed comprising $C_5$ olefins and diolefins or a mixture of $C_5$ and $C_6$ olefins and diolefins, said feed being obtained from the cracking of petroleum feedstock and being subjected to thermal soaking at a temperature of 100° C to 150° C, and (2) a branched chain reactive aliphatic olefin (as hereinafter defined) or an oxygenated transfer agent or a combination of a $C_8$ to $C_{10}$ unsaturated aromatic compound with a branched chain reactive olefin (as hereinafter defined) or with an oxygenated transfer agent. The reactive olefin or oxygenated transfer agent are feed additives to control the resin molecular weight and narrow the resin molecular weight distribution.

The $C_5$ or $C_6$ diolefin and olefin containing feed is obtained from the cracking of petroleum feedstock. Such feedstocks include naphthas, kerosene, gas oil and vacuum gas oil. These feedstocks usually have a boiling point range of from 20° to 450° C.

The petroleum feedstock is cracked, preferably in the presence of steam, and the recommended cracking temperature is between 500° and 870° C. The product which contains unsaturated hydrocarbons usually boiling in the range to 20° to 240° C, e.g. 20° to 230° C, preferably is thereafter subjected to fractionation to remove $C_2$ to $C_4$ light ends. The feedstock is thereafter subjected to thermal soaking at a temperature between 100° C and 150° C, preferably 120° to 140° C e.g. at about 130° C. The thermal soaking preferably takes 0.5 to 6 hours e.g. 0.5 to 1 hour. Low temperatures are preferred in order to limit the cyclic diene (cyclopentadiene and methyl cyclopentadiene) codimerization with $C_5$ linear conjugated dienes (isoprene and pentadienes 1,3 cis- and trans). After thermal soaking the feedstock is preferably subjected to distillation to remove cyclic conjugated diolefins which are gel precursors (cyclopentadiene and methylcyclopentadiene being removed as dimers).

After thermal soaking and distillation one obtains an overhead naphtha which usually boils from 25° to 110° C, e.g. 25° to 80° C, the best results being achieved with a 25°–70° C cut. This overhead naphtha comprises mainly $C_5$ diolefins such as isoprene and 1,3 cis - and trans - pentadienes, $C_5$ to $C_6$ monoolefins and aromatics for example benzene. In general the overhead naphthas have the following compositions which obviously depends on the nature of the petroleum feedstock which is subjected to steam cracking :

|  | % by weight |
|---|---|
| Total paraffins | 1.0 to 41.5 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadiene 1,3 | 14.5 to 4.5 |
| Cyclopentadiene | 1.0 to 2.5 |

The feed could be significantly isoprene free provided this compound is previously recovered through any conventional extraction process such as extractive distillation or azeotropic distillation. Moreover depending on the final boiling point of the feed cut the feedstock could be substantially free of benzene. Cyclopentene contents are generally below 3.0 wt.%.

The cyclodiene dimers produced during the 100°–150° C, thermal soaking step are generally not included in the feed to be polymerised, because they are detrimental to the specific properties of the resins. However, if required for special application areas they could be left in the resin feed, the distillation step previously mentioned therefore being carried out before the thermal soaking step.

The branched-chain reactive aliphatic olefin feed additive which has the role of resin molecular weight regulator is defined as an U.O.P. olefin or diisobutene.

U.O.P. olefins are branched chain olefins where the chain length varies from 4 to 30 carbon atoms, preferably from 5 to 9 carbon atoms per molecule, U.O.P. olefins are manufactured by oligomerisation of propylene with an acidic catalyst like phosphoric acid and recovered by fractionation. They have an extremely high branched structure. Usually the shorter chain olefins are the more reactive. A typical analysis is shown in table 1.

Table 1

| Typical analysis of Light U.O.P. Olefins | |
|---|---|
| Specific gravity at 15° C | 0.684 |
| ASTM distillation (D86) | |
| IBP° C | 28 |
| S.vol.% | 56 |
| 10 | 66 |
| 20 | 70 |
| 30 | 75 |
| 40 | 80 |
| 50 | 83 |
| 60 | 89 |
| 70 | 95 |
| 80 | 103 |
| 90 | 114 |
| FBP | 121 |
| Olefins content (F.I.A.) | |
| vol.%. | 80–90 |
| Gas chromatographic analysis after hydrogenation (wt.%) | |
| Lighter than $C_6$'s | 6.12 |
| $C_6$'s | 26.63 |
| $C_7$'s as : | 20.05 |
| 2,2 Dimethyl Pentane | 0.56 |
| 2,4 Dimethyl Pentane | 3.18 |
| 2,2,3 Trimethyl Butane | 0.29 |
| 3,3 Dimethyl Pentane | 0.08 |
| 2 Methyl Hexane | 1.80 |
| 2,3 Dimethyl Pentane | 8.75 |
| 3 Methyl Hexane | 4.26 |
| 3 Ethyl Pentane | 0.41 |
| n Heptane | 0.72 |
| $C_8$'s as : | 28.29 |
| 2,2,4 Trimethyl Pentane | 0.88 |
| 2,2 Dimethyl Hexane | 1.60 |
| 2,5 Dimethyl Hexane | 1.76 |
| 2,4 Dimethyl Hexane | 9.61 |
| 3,3 Dimethyl Hexane | 0.99 |
| 2,3,4 Trimethyl Pentane | 0.20 |
| 2,3 Dimethyl Hexane | 5.07 |
| 3,4 Dimethyl Hexane | 5.72 |
| 3 Methyl Heptane | 2.25 |
| n-octane | 0.21 |
| $C_9$'s : | 18.91 |

Other branched aliphatic olefins of similar structure can be produced from fluid catalytic cracked naphtha.

Di-isobutene can be a pure component or preferably a steam cracked petroleum derivative obtained by isobutene extraction with sulphuric acid and recovered as the dimer by thermal decomposition of the corresponding organic sulphate. The di-isobutene concentrate contains the isobutene dimers such as 2,2,4 trimethyl-2-pentene and 2,2,4 trimethyl-1-pentene but also a significant amount of isobutene trimers (typical analysis shown in table 2). It can be purified by distillation if required.

Table 2

| Composition of diisobutene concentrate | |
|---|---|
| $C_4$'s | 0.7 wt % |
| 2,4,4 trimethyl pentene 1 | 48.2 |
| 2,4 4 trimethyl pentene 2 | 14.2 |
| Other $C_8$'s | 21.6 |
| $C_{12}$'s | 15.3 |
| Sulphur | 64 mg/l at 23° C |

When branched chain reactive aliphatic olefins are used their amount can vary, depending on the softening point of the resin to be obtained, from 10 to 400%, preferably 30 to 100%, by weight of the amount of original steam cracked petroleum resin feed.

The oxygenated transfer agents include mono-, di- or tri- substituted phenols, the substituent being a $C_1$ to $C_{30}$ or preferably $C_1$ to $C_6$ straight chain or branched chain hydrocarbyl group e.g. methyl, ethyl, propyl, butyl, amyl or their secondary or tertiary isomers. (e.g. 2,6 ditertiary-butyl-4-methyl phenol), alcohols, esters, dialkyl ethers, alkaryl ethers, the alkyl group in the ether being $C_1$ to $C_{30}$, preferably $C_1$ to $C_6$ straight or branched chain hydrocarbyl group, e.g. methyl, ethyl, amyl or their secondary or tertiary isomers, (e.g. anisole), organic acids or anhydrides (e.g. maleic anhydride). The oxygenated transfer agent should preferably have a boiling point lower than 300° C. If low boiling point compounds e.g. diethyl ether, are used the polymerisation temperature and pressure should be carefully chosen so as to maintain them in the liquid state. Moreover their selection should be made very carefully because they have the tendency to complex the Friedel Crafts catalyst used during the polymerisation step and therefore reduce considerably the resin yield.

Most efficient compounds in presence of $AlCl_3$ are dialkyl ethers or an alkaryl ether, such as anisole. Nevertheless the polymerisation being carried out between 40° to 80° C it is fundamental to select an additive of adequate boiling point in order to maintain it in the liquid phase.

The amount of oxygenated compound used as transfer agent can vary from 0.1 to 5 wt.% preferably 0.5 to 2 wt.% based on the weight of petroleum resin feed. They are generally less attractive than branched chain reactive aliphatic olefins previously described.

The $C_8$ to $C_{10}$ unsaturated aromatic compound which may be admixed with the reactive olefin or oxygenated transfer agent may for example be styrene, α-methyl styrene, vinyl toluene, indene, methyl indene or chlorostyrene. When used, the concentration should preferably vary from 10 to 400% by weight, particularly 10 to 50% by weight based on the weight of the petroleum resin feed.

By way of comparison other transfer agents have been used like substituted aromatics such as monosubstituted aromatics (toluene, ethyl benzene, propyl and isopropyl benzene) or preferably di- or tri-alkyl substituted benzene wherein each alkyl group has 1 to 6 carbon atoms and is of either linear or branched structure. Typical examples are xylenes and mesitylene.

Disubstituted aromatics of low molecular weight show a stronger transfer activity during the cationic polymerisation process. Xylenes are a typical example. However even though at a given concentration they provide generally a more pronounced resin softening point depressing power than branched chain reactive aliphatic olefins feed additives they unfortunately afford at given resin softening point a significantly lower tackiness, mainly in styrene/isoprene block copolymers (thermoplastic Cariflex TR 1107 rubbers).

The petroleum resin feed and the previously described additives are mixed according to the ratios outlined above and then polymerized using a Friedel Crafts catalyst for example aluminium chloride, aluminium bromide or a liquid aluminium chloride/hydrochloric acid alkyl substituted aromatic hydrocarbon complex, the aromatic hydrocarbon being for example o-xylene, mesitylene, ethyl benzene, isopropyl benzene and the like, such as other short or long chain alkyl benzenes. The alkyl chain can be linear or branched and can vary from 1 to 30 carbon atoms.

Acid liquid $AlCl_3$ sludges obtained as by-products during the alkylation of benzene or any other substituted aromatics (e.g. toluene or xylenes) with branched chain olefins can be directly used as catalyst for the above described polymerisation process. The branched chain olefins which are for example, produced via the boron trifluoride oligomerisation of propylene and fractionation, e.g. $C_{12}$ olefins or $C_{24}$ olefins, can be alkylated with aromatics producing in situ sludge. As an example the acidic sludge available from a dodecylbenzene plant provided similar results to the preformed o-xylene $AlCl_3$/HCl liquid complex.

These liquid complexes are slightly more efficient than $AlCl_3$ powder at equivalent concentration and provide slightly higher resin yields and lower resin molecular weight. Therefore, the amount of feed additive required for narrowing the resin molecular weight is significantly reduced. Moreover when by-product sludges are available in plate site, the catalyst cost is reduced and such a process is particularly attractive.

In the polymerisation process the amount of catalyst may vary from 0.25 to 3.0 wt.% preferably 0.5 to 1.5 wt.% based on the weight of the mixture to be polymerized. The optimum concentration depends on the nature of the solvent which affects the solubility of the catalyst as well as on the stirring efficiency inside the polymerization reactor. High catalyst concentration reduces the resin molecular weight distribution and therefore limits the amount of feed additive required for controlling the resin molecular weight.

Other Friedel Crafts catalysts like titanium tri-or tetrachloride, tin tetrachloride, boron trifluoride, boron trifluoride complexes with organic ethers, phenols or acids can also be used but they lead to rather low resin yields and large quantities of liquid oligomers of low value are obtained. Even through these oily oligomers can be upgraded as reactive plasticizer or liquid plasticizer such catalysts are not recommended. Other possible catalyst can be acidic clays.

Usual polymerisation temperatures are between $-20°$ and 100° C, preferably between 30° and 80° C.

After polymerisation the residual catalyst may be removed by for example washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins/unreactive olefins) and low molecular weight oily oligomers by steam stripping or vacuum distillation. The finished product is a substantially non-aromatic unsaturated thermoplastic hydrocarbon resin. It usually has a softening point of from 20° to 125° C, preferably 25° to 85° C, or better 70°-85° C.

The aromatic free resins obtained can be used in many applications which require low viscosity, good flexibility and elongation before or after chemical modification with polar compound such as phenols, unsaturated anhydrides such as maleic anhydride or unsaturated acids (e.g. fumaric acid). These resins are designed for a wide range of end uses and applications. They can be applied on paper, metal, thermoplastic films (cellophane, polyesters, PVC, woven or non woven fabrics, glass etc. and for bonding such materials together). Typical applications are hot melts, carpet backing, coatings with drying oil formulations, book binding, paper sizing or in any applications involving natural or synthetic resins and/or rubbers such as caulks, sealants or rubbers tackification. More especially their use as elastomer tackifier should be emphasised with natural rubber or synthetic rubbers (polyisoprene, EPDM, butyl, chorobutyl, bromobutyl, neoprene and block copolymers for example styrene/isoprene rubber (Shell TR 1107) or the like or their mixtures. Even though these resins are significantly non aromatic they provide outstanding tackiness with such elastomers and high resin/rubber ratio can be used reducing therefore the adhesive formulation cost (the resin being significantly cheaper than the block styrene/isoprene rubber).

Other applications involving such resin properties are pressure sensitive adhesives, hot melt adhesives, low temperature adhesives, label adhesives, latex adhesives, surgical tapes and masking tapes.

Thus, hot melt adhesives and latex adhesives can be prepared from styrene - isoprene copolymers and a tackifying resin. The low softening point aliphatic petroleum resins are a replacement for aromatic resins or rosin and terpenes derivatives. In the hot melt adhesive the formulations can be prepared by mixing the thermoplastic rubber and the petroleum resin at 150° C. Latex adhesives can be prepared by emulsifying in water the thermoplastic rubber or an oil extended thermoplastic rubber (block styrene - isoprene copolymer) with the petroleum resin in presence of a diluted solution of a soap such as rosin salt.

Other elastomers consisting of styrene and butadiene either with random or block configuration (Shell SBR 1011 or Shell TR 1102 or the like), are not tackified satisfactorily by such non aromatic resins of extremely narrow molecular weight and low softening point. However acceptable results are achieved with blends of SBR and natural rubber.

When used in natural or synthetic rubber formulations the resins of this invention can provide excellent tackifying properties without the assistance of oil extenders. For example the resin can be used in inner tube formulations where the presence of oil would reduce drastically the rubber impermeability. Usually the amount of the resin produced by the process of this invention which is mixed with the rubber in such applications is 65 to 250 phr., e.g. 100 to 175 phr.

In all the Examples which follow the feed obtained from the cracking of petroleum feedstock has been thermally soaked at a temperature of 135° C for about 1 hour.

EXAMPLE 1

For comparison purpose the efficiency of several Friedel Crafts catalysts has been tested by polymerising a mixture of a steam cracked feedstock of 25°–70° C boiling point using 30 wt.% benzene as solvent. Paraffinic or olefinic solvent could be used in the same way as replacements for benzene. The steam cracked feedstock has the overall composition:

|  |  | Solvent excluded | Solvent included |
|---|---|---|---|
| Paraffins | wt.% | 2.30 | 1.60 |
| $C_5$ & $C_6$ Diolefins | wt.% | 43.00 | 30.10 |
| $C_5$ & $C_6$ Olefins | wt.% | 47.00 | 32.90 |
| Benzene | wt.% | 7.70 | 35.40 |
| Typical $C_5$ diolefins | wt.% |  |  |
| Isoprene |  | 19.50 | 13.65 |
| Pentadiene 1,3 trans |  | 10.90 | 7.65 |
| Pentadiene 1,3 cis |  | 6.30 | 4.40 |
| Cyclopentadiene |  | 2.10 | 1.50 |
| Typical $C_5$ olefins | wt.% |  |  |
| 2 Methyl butene 1 |  | 7.95 | 5.60 |
| 2 Methyl butene 2 |  | 8.50 | 5.95 |
| Pentene 1 |  | 7.85 | 5.50 |
| Cyclopentene |  | 3.65 | 2.55 |

Resin properties are shown in Table No. 3. Due to higher resin yield $AlCl_3$ or $AlBr_3$ is preferred.

Table 3

| Comparative Efficiency of Friedel Crafts catalysts | | | | | | | |
|---|---|---|---|---|---|---|---|
| Catalyst nature | $AlCl_3$ | $AlBr_3$ | $AlBr_3$ | $BF_3$ etherate | $BF_3$ etherate/ $H_2O$ | $TiCl_4$ | $SnCl_4$ |
| Catalyst content : |  |  |  |  |  |  |  |
| wt % | 0.75 | 0.75 | 1.50 | 0.75* | 0.75* | 0.38* | 1.06 | 1.46 |
| m mole/100g | 5.62 | 2.81 | 5.62 | 11.06* | 11.06* | 5.62* | 5.62 | 5.62 |
| Polymerisation temperature C° | 50 | 50 | 50 | 50 | 50 | 50 | 50 | 50 |
| Polymerisation time min. | 60 | 60 | 60 | 60 | 60 | 60 | 60 | 60 |
| Resin Yield wt % | 36.8 | 11.0 | 36.0 | 23.0 | 18.0 | 17.0 | 25.0 | 15.6 |
| Oligomer Yield wt % | 1.9 | 1.0 | 1.5 | 17.4 | 25.0 | 16.0 | 3.4 | 3.4 |
| Resin Gardner colour (50wt % in toluene) | 4⁻ | 12⁻ | 4.5 | 2.5 | 6⁺ | 4⁺ | 7 | >18 |
| Resin Gardner colour after heating : |  |  |  |  |  |  |  |  |
| 3hr at 150° C | 8⁺ | 13⁺ | 11⁺ |  | 10⁺ | 8⁺ | 14⁻ | >18 |
| 16hr at 150° C | 14⁻ | 15⁺ | 16⁻ | 14⁺ | 14⁺ | 14⁻ | 17⁺ | >18 |
| Resin softening point C° | 95 | 77 | 101 | <20 | <20 | <20 | 40 | <20 |
| Wax cloud point C° Wax(**)/EVA250/resin 70/15/15 wt % | 140 | 180 | 105 |  |  |  |  |  |

(*)as $BF_3$
(**)wax melting point : 65° C
EVA 250 = Elvax 250 Dupont = Ethylene vinyl acetate copolymer.

EXAMPLE 2

The efficiency of $AlCl_3/HCl/$ substituted aromatic complexes as well as the effect of $AlCl_3$ concentration upon resin properties have been studied within the 0.5 - 1.5 wt.% catalyst concentration range.

Acidic $AlCl_3$ complexes were either a dodecylbenzene sludge containing 25 wt.% $AlCl_3$ and 2.0 wt.% HCl or an artificial complex of a aluminium trichloride, hydrogen chloride and o-xylene which was prepared as follows:

Gaseous dry hydrogen chloride was bubbled through a very well stirred $AlCl_3$/o-xylene mixture (1 mole or each). $AlCl_3$ was progressively dissolved while HCl was absorbed in the reaction mixtures until 0.5 mole was reacted.

The composition of this liquid complex was as follows:

| | | |
|---|---|---|
| $AlCl_3$ | wt.% | 51.8 |
| O-xylene | wt.% | 41.2 |
| HCl | wt.% | 7.0 |

The 28°-80° C steam cracked feedstocks had the following composition.

| | | Feed A | Feed B |
|---|---|---|---|
| Paraffins | wt.% | 0.40 | 21.30 |
| $C_5 C_6$ diolefins | wt.% | 33.95 | 27.00 |
| $C_5 C_6$ olefins | wt.% | 39.75 | 25.55 |
| Aromatics (Benzene) | wt.% | 25.80 | 26.15 |
| Unidentified | wt.% | 0.10 | |
| Typical $C_5$ diolefins | wt.% | | |
| Isoprene | | 12.63 | 11.85 |
| Pentadiene 1,3 trans | | 9.10 | 5.95 |
| Pentadiene 1,3 cis | | 5.75 | 4.30 |
| Cyclopentadiene | | 1.27 | 1.40 |
| Typical C5 olefins | wt.% | | |
| 2 Methyl butene 1 | | 6.60 | 5.05 |
| 2 Methyl butene 2 | | 3.60 | 2.95 |
| Pentene 1 | | 9.65 | 4.75 |
| Cyclopentene | | 2.20 | 1.50 |

As shown in Table 4 increasing the catalyst concentration reduces considerably the resin molecular weight and resin softening point. Aluminium chloride acidic aromatic complexes are more active than aluminium chloride powder.

EXAMPLE 3

Table 5 gives several examples of the production of low softening point resins obtained by addition of oxygenated transfer agents to the 28°-80° C steam cracked petroleum feedstock shown in Example 2 (feed B). Manufacturing conditions were those shown in Table 4, $AlCl_3$ being used as catalyst at the 0.75 wt.% level.

Table 5

| Oxygenated compounds as transfer agents | | | | |
|---|---|---|---|---|
| Feed (B) wt % | 100 | 100 | 100 | 100 |
| Additive nature | | anisole | 2,6 ditertiary butyl- 4 methyl phenol | maleic anhydride |
| Additive wt % | | 1 | 1 | 1 |
| Resin yield wt % | 30.5 | 19.1 | 30.2 | 10.9 |
| Resin Gardner colour (50 wt % in toluene) | 6 | 6.5 | 7⁻ | 14.5 |
| Resin Gardner colour after heating 16 hr at 150° C | >18 | 13.5 | 14.5 | 15.5 |
| Softening point ° C | 108 | 72 | 96 | 91 |
| Resin molecular weight ($\overline{Mn}$) | 2725 | 1925 | 2300 | 2395 |

EXAMPLE 4

Table 6 gives two examples of the production of low softening point resins by using $C_5 - C_8^+$ U.O.P. olefins (Table 1). The steam cracked naphtha was a 28°-80° C cut of following overall composition:

| | | wt.% |
|---|---|---|
| Paraffins | wt % | 9.85 |
| $C_5$ & $C_6$ diolefins | wt % | 30.60 |
| $C_5$ & $C_6$ olefins | wt % | 32.80 |
| Benzene | wt % | 26.00 |
| Unidentified | wt % | 0.75 |
| Typical $C_5$ diolefins | wt % | |
| Isoprene | | 14.95 |
| Pentadiene 1,3 trans | | 6.85 |
| Pentadiene 1,3 cis | | 4.00 |
| Cyclopentadiene | | 1.50 |
| Typical $C_5$ olefins | wt % | |
| 2 Methyl butene 1 | | 6.85 |
| 2 Methyl butene 2 | | 2.04 |
| Pentene 1 | | 6.90 |
| Cyclopentene | | 2.45 |

The polymerisation conditions were those described in Table 4, 0.75 wt.% of $AlCl_3$ being used as catalyst.

Table 4

| Effect of catalyst concentration & catalyst nature | | | | | | | |
|---|---|---|---|---|---|---|---|
| Feed | A | A | A | A | B | B | B |
| Catalyst nature | $AlCl_3$ | $AlCl_3$ | $AlCl_3$ | $AlCl_3$ | $AlCl_3$ | $AlCl_3$/HCl/ o-xylene | DDB sludge |
| $AlCl_3$ wt. % | 0.5 | 0.75 | 1.00 | 1.50 | 0.75 | 0.75* | 0.75* |
| Polymerisation temperature C° | ← | | | 50 | | | → |
| Polymerisation time (min) | ← | | | 60 | | | → |
| Resin Yield (wt %) | 26.6 | 42.1 | 47.5 | 44.5 | 30.5 | 35.9 | 34.7 |
| Resin Gardner colour (50wt % in toluene) | 6⁻ | 4⁺ | 4.5 | 4.5 | 6 | 6⁻ | 6⁺ |
| Resin Gardner colour after heating 16 hr at 150° C | | 17⁻ | 17 | 13.5 | | | |
| Softening point ° C | 95 | 102 | 103 | 92 | 108 | 107 | 113 |
| Molecular weight ($\overline{Mn}$) | 2960 | 2380 | 2125 | 1490 | 2725 | 2130 | 2275 |
| Wax cloud Point Wax/EVA250/resin 70/15/15 wt % | >250 | 235 | 180 | 65 | >250 | 180 | 200 |
| Viscosity cps at 25° C (60 wt % in toluene) | 467 | 190 | 132 | 51 | | | |

(*)as $AlCl_3$

Table 6
LOW SOFTENING POINT RESIN U.O.P. OLEFINS AS FEED ADDITIVE.

| Resin sample reference : | 1 | 2 |
|---|---|---|
| Feed (wt %) | 100 | 70 |
| Additive nature |  | U.O.P. Olefins |
| Additive concentration (wt %) | 0 | 30 |
| Resin yield (wt %) | 34.5 | 25.0 |
| Resin Gardner colour (50 wt % in toluene) | 5+ | 5 |
| Resin Gardner colour after heating 16hr at 150° C | 17− | 14 |
| Softening point ° C | 102 | 76 |
| Wax cloud point ° C Wax/EVA 250/resin |  |  |
| 70/15/15 wt % | 235 | <65 |
| 60/20/20 wt % |  | <65 |
| Resin molecular weight ($\overline{Mn}$) | 2380 | 1050 |
| Resin viscosity (cps at 25° C) (20 wt % in toluene) | 189 | 30 |

These compounds are very effective in reducing the resin molecular weight and as a result lowering considerably the resin viscosity and improving the wax compatibility.

EXAMPLE 5

In this Example the reactivity of U.O.P. olefins (Table 7) and di-isobutene are compared to those obtained with some olefins (2 Methyl butene 2, 2 Methyl butene 1). Experiments with o-xylene as additive (designated Resin Sample 11) are described hereinafter.

The steam cracked resin feed was a 25°–70° C cut already described in Example 1. Polymerisations conditions were standard, involving 0.75 wt % AlCl$_3$ powder as catalyst and the polymerization step was carried out at 50°–60° C for 90 minutes. In all cases outstanding wax/ethylene vinyl acetate compatibility was noticed.

For comparison purpose these additives were replaced by aromatic monomers (styrene, methyl styrene, vinyl toluene, indene) and corresponding resins properties are outlined in Table 8.

Table 7
COMPARISON OF BRANCHED OLEFINS AS FEED ADDITIVES

| Resin Sample reference | 4 | 5 | 6 | 7 | 8 | 9 | 10 | 12 |
|---|---|---|---|---|---|---|---|---|
| Feed wt % | 70 | 50 | 50 | 50 | 45 | 50 | 45 | styrene 30 |
| Solvent (benzene) wt % | 30 | 30 | 30 | 30 | 30 | 30 | 30 | n-heptane 55 |
| Additive nature wt % |  | 2Me butene 1 | 2Me butene 2 | U.O.P. Olefins | U.O.P. Olefins | diiso-butylene | diiso-butylene | diisobutylene 15 |
| Additive wt % | 0 | 20 | 20 | 20 | 25 | 20 | 25 |  |
| Resin yield wt % | 39.4 | 31.8 | 30.5 | 31.3 | 25.8 | 31.9 | 28.8 |  |
| Oligomer yield wt % | 3.2 | 12.7 | 13.2 | 5.7 |  | 7.8 |  |  |
| Resin Gardner colour (50 wt % in toluene) | 3+ | 4+ | 5 | 5− | 4.5 | 5− | 5− | 4− |
| Resin Gardner colour after heating 16 hr at 150° C | 13− | 13.5 | 13+ | 13 |  | 13.5 |  |  |
| Resin softening point ° C | 98 | 64 | 84 | 83 | 78 | 86 | 75 | 59 |
| Resin molecular weight ($\overline{Mn}$) | 2000 | 950 | 1055 | 1190 |  | 1140 | - |  |
| Wax cloud point ° C Wax / EVA 250 / Resin |  |  |  |  |  |  |  |  |
| 70/15/15 wt % | 135 | <65 | <65 | <65 | <65 | <65 | <65 | <65 |
| 60/20/20 wt % |  | <65 | <65 | <65 | <65 | <65 | <65 | <65 |
| 50/25/25 wt % |  | <65 | <65 | <65 | <65 | <65 | <65 | <65 |
| Resin viscosity (60 wt % in toluene) cps at 25° C | 134 | 24 | 23 | 33 |  | 30 |  |  |

| Resin Sample reference | 19 | 20 |
|---|---|---|
| Feed Wt. % | 50 | 50 |
| Solvent (benzene) Wt. % | 30 | 30 |
| Additive nature Wt. % | U.O.P.olefins | diisobutylene |
| Additive Wt. % | 20 | 20 |
| Resin Yield Wt. % | 30.5 | 33.4 |
| Oligomer yield Wt. % | 7.1 | 9.1 |
| Resin Gardner Colour (50 wt % in toluene) | 2+ | 2+ |
| Resin Gardner Colour after heating 16 hours at 150° C | 13 | 13− |
| Resin Softening Point ° C | 80 | 81 |
| Resin Molecular Weight ($\overline{Mn}$) | 1485 | 1230 |
| Wax Cloud Point ° C Wax/EVA 250/Resin |  |  |
| 70/15/15 Wt. % | <65 | <65 |
| 60/20/20 Wt. % | <65 | <65 |
| 50/25/25 Wt. % | <65 | <65 |
| Resin viscosity (60 wt % in toluene) cps at 25° C |  |  |

The benzene solvent was used only as a typical case - Could be replaced by any conventional solvent like parafins, olefins, halides or their mixture.

TABLE 8
COMPARATIVE RESIN PROPERTIES WITH AROMATICS

| Resin sample reference | 13 | 14 | 15 | 16 | 17 |
|---|---|---|---|---|---|
| Feed | 50 | 50 | 50 | 60 | 50 |
| Solvent (benzene) | 30 | 30 | 30 | 30 | 30 |
| Aromaticss | styrene | α-methyl styrene | vinyl toluene | indene | indene |
| Aromatics | 20 | 20 | 20 | 10 | 20 |
| Resin yield | 49.5 | 42.6 | 46.2 | 37.5 | 33.1 |
| Oligomer yield | 6.0 | 11.2 | 7.5 | 2.5 | 6.0 |
| Resin Gardner colour (50 wt % in toluene) | 4− | 4− | 3+ | 5 | 6+ |
| Resin Gardner colour after heating 16 hr at 150° C | 12− | 13− | 12− | 14− | 14+ |

TABLE 8-continued

| COMPARATIVE RESIN PROPERTIES WITH AROMATICS | | | | | |
|---|---|---|---|---|---|
| Resin sample reference | 13 | 14 | 15 | 16 | 17 |
| Resin solftening point C° | 90 | 79 | 87 | 108 | 116 |
| Resin molecular weight (Mn̄) | 1220 | 945 | 1085 | 1760 | 1810 |
| Wax cloud point ° C | | | | | |
| Wax/EVA 250/resin | | | | | |
| 70/15/15 wt % | <65 | <65 | <65 | 68 | 200 |
| 60/20/20 wt % | <65 | <65 | <65 | | |
| 50/25/25 wt % | <65 | <65 | <65 | | |
| Resin viscosity | | | | | |
| (60 wt % in toluene) | | | | | |
| cps at 25° C | 50 | 27 | 40 | 134 | 156 |

The Figure indicates that the low softening point resins described in Table 7 are characterized by an extremely narrow molecular weight distribution.

EXAMPLE 6 PRESSURE SENSITIVE ADHESIVES

A sample of natural rubber of adequate Mooney viscosity was solubilized in a n-heptane/toluene solution with the petroleum resin prepared according to and an antioxidant. The pressure sensitive adhesive film used for tack measurement was prepared by evaporating overnight at room temperature, a thin layer of rubber/resin solution spread on a cellophane or polyester film. The adhesive mass was 30g/m².

The pressure sensitive adhesive properties are those developed by the technical committee of the pressure sensitive tape council (PSTC) and more especially:
- 180° C Peel adhesion (PSTC-1 method)
- Tack rolling Ball method (PSTC-6)
- PolyKen tack
- Shear adhesion (PSTC-7) modified in order to have accelerated results.

The adhesive tape is applied upon Kraft paper instead of stainless steel panels. Failure is also recorded in hours. Load 1 kg. contact area: 12.5 × 25 mm adhesive tape: width 12.5 mm.

The adhesive formulation was based on natural rubber (65 Mooney viscosity) and the resin content was 100 phr. (parts per hundred parts of rubber). As expected from their narrow molecular weight distribution these low softening point resins exhibited a good tackiness for natural rubber. However their cohesive strength was relatively weaker than the conventional petroleum resins which are produced with lower additive concentrations. Typical properties are shown as follows:

| Resin Sample Reference | Petroleum resin | 2 | 6 | 7 | 9 | 11 | 13 | 15 | 16 |
|---|---|---|---|---|---|---|---|---|---|
| 180° Peel strength grams/25 mm | 1050 | 850 | 725 | 790 | 680 | 960 | 995 | 1050 | 1100 |
| PolyKen tack grams | 950 | 800 | 650 | 800 | 750 | 850 | 900 | 1000 | 950 |
| Tack Rolling Ball method - cm | 4 | 5 | 1 | 2 | 2 | 4 | 2 | 2 | 8 |
| Shear nr to failure | 2 | 1 | 2.5 | 1 | 2.5 | 1.5 | 1 | 2 | 3 |

EXAMPLE 7

This example is similar to Example 6 except that resins 19 and 20 (Example 5, Table 7) were mixed with natural rubber. The results obtained are given in Table 9.

TABLE 9

PRESSURE SENSITIVE ADHESIVES BASED ON NATURAL RUBBER
Resin/Rubber Ratio 50/50
(Resin 100 phr.)

| RESIN SAMPLE REFERENCE | 19 | 20 |
|---|---|---|
| 180° Peel Strength grams/25 mm | 655 | 655 |
| Polyken Tack grams | 700 | 750 |
| Tack Rolling Ball Method cm | 1.5 | 1.5 |

EXAMPLE 8

Another example of pressure sensitive adhesive was based on a random styrene butadiene copolymer extended with oil extended random "cold" (polymerized at 5° C) styrene-butadiene rubber having a styrene content of 23.5 wt%, a Mooney viscosity at 100° C of 55 and containing 37.5 phr of naphthenic oil extender (SBR 1707). Resin concentration 65 phr.

| Resin Sample Reference | 6 | 7 | 9 | 13 | 14 | 15 | 16 |
|---|---|---|---|---|---|---|---|
| 180° Peel strength gram/25 mm | 1200 | 1300 | 1150 | 1400 | 1517 | 1180 | 725 |
| PolyKen tack grams | 600 | 650 | 650 | 700 | 650 | 700 | 50 |
| Tack Rolling Ball method - cm | >30 | >30 | >30 | 3.5 | 2 | 3 | >30 |

As expected from their structure these resins have less tackiness than aromatic containing resins.

EXAMPLE 9

Other random styrene butadiene copolymers (SBR 1011) are not tackified by the low softening point aliphatic resins. However is a small concentration of natural rubber is included acceptable values are obtained.

| Resin Sample | 9 | 9 | 13 | 14 | 15 |
|---|---|---|---|---|---|
| SBR 1011 (parts) | 100 | 100 | 100 | 100 | 100 |
| Natural rubber (parts) | | 10 | | | |
| Resin (Example 5) | 65 | 9 | 65 | 65 | 65 |
| 180° Peel strength gram/25 mm | 725 | 1225 | 1585 | 1790 | 1450 |
| PolyKen tack cm | 0 | 900 | 700 | 900 | 900 |

-continued

| Resin Sample | 9 | 9 | 13 | 14 | 15 |
|---|---|---|---|---|---|
| Tack rolling Ball method - cm | >30 | 5 | 13 | 3 | 8 |

EXAMPLE 10

Similar pressure sensitive adhesive formulations were prepared with synthetic thermoplastic block styrene-isoprene rubber i.e. Cariflex or (in the USA, KRATON TR 1107), supplied by Shell. The styrene content measured by NMR was 29 wt.%. Resin contents varied from 65 to 235 phr.

It has been found that with low softening point aliphatic resins, outstanding tackiness is achieved even at high resin concentration (235 phr.) without need for extender oil, or aromatics presence in the resin structure. In addition these resins being significantly cheaper than aromatic resins, polyterpenes or rosin derivatives tackifiers, the corresponding adhesive formulation could be developed at a low cost level.

Table 10 gives properties of typical pressure sensitive adhesive formulations. Aromatics containing resins prepared in the same way are only included for comparison purpose.

TABLE 10
LOW SOFTENING POINT ALIPHATIC RESINS AS STYRENE-ISOPRENE TACKIFIER— EFFECT OF RESIN CONTENT

| Resin Sample | 5 | | | | 6 | | | | | 9 | | | |
|---|---|---|---|---|---|---|---|---|---|---|---|---|---|
| Resin/Rubber ratio | 40/60 | 50/50 | 60/40 | 70/30 | 40/60 | 60/40 | 40/60 | 50/50 | 60/40 | 70/30 | 40/60 | 50/50 | 60/40 |
| Resin content (phr) | 67 | 100 | 150 | 233 | 67 | 150 | 67 | 100 | 150 | 233 | 67 | 100 | 150 |
| 180° peel strength (grams/25 mm) | 1700 | 2355 | 3170 | 2990 | 1720 | 3350 | 1725 | 1970 | 3330 | 3670 | 1925 | 2400 | 2945 |
| PolyKen tack (grams) | 675 | 1000 | 1250 | 1500 | 850 | 1650 | 850 | 1200 | 1650 | 1350 | 900 | 1250 | 1600 |
| Tack Rolling Ball (cm) | 1 | 1 | 1 | 1 | 1 | 1.5 | 1 | 1.5 | 3 | 7 | 1 | 1.5 | 2 |
| Shear on paper (hr to failure) | 19 | | 17 | | | | | | | | | | |

| Resin Sample | | 11 | | | 13 | | | 14 | | 15 | |
|---|---|---|---|---|---|---|---|---|---|---|---|
| Resin/Rubber ratio | 40/60 | 50/50 | 60/40 | 40/60 | 50/50 | 60/40 | 70/30 | 40/60 | 60/40 | 40/60 | 60/40 |
| Resin content (phr) | 67 | 100 | 150 | 67 | 100 | 150 | 233 | 67 | 150 | 67 | 150 |
| 180° Peel strength (grams/25 mm) | 1700 | 2150 | 3400 | 1880 | 2310 | 2990 | 4990 | 1700 | 2785 | 1630 | 2945 |
| PolyKen tack (grams) | 950 | 1300 | 1500 | 1100 | 1200 | 1600 | 1150 | 1000 | 1600 | 1100 | 1600 |
| Tack Rolling Ball (cm) | 3 | 5.5 | 10 | 3 | 5.5 | 30 | 30 | 2 | 8 | 3 | 17 |
| Shear on paper (hr to failure) | | | | | | | | | | | |

It is obvious that at equivalent resin softening point the aliphatic resins exhibit a significantly better tackiness than aromatics-containing resins. Moreover, extender oils are not required in the formulation, the tackiness being maintained at extremely high resin levels (233 phr).

Irrespective of their structure, branched reactive olefins additives provided similar properties which were better than substituted aromatics such as o-xylene.

Low softening points resins as tackifiers for styrene-isoprene copolymers can be produced from either IBP-70° or IBP-80° C steam cracked feedstocks but as described below better tackification occurs with resins derived from IBP-70° C fractions.

| Resin sample | 2 | 7 | 11 | 16 |
|---|---|---|---|---|
| Resin pHR | 150 | 150 | 150 | 150 |
| 180° Peel strength grams/25 mm | 2900 | 3330 | 3400 | 2945 |
| PolyKen tack grams | 1150 | 1650 | 1500 | 0 |
| Tack Rolling Ball method - cm | 3 | 3 | 10 | >30 |

Above the 150 phr resin concentration it appears that aromatics resins lose their tackification power for Cariflex TR 1107 elastomers and among the aromatic monomers indene is the most critical one.

EXAMPLE 11

This example is similar to Example 10 and resin contents varied from 67 to 150 phr. The rubber which was used was Cariflex TR 1107 and the resin which was used was obtained from a 25° – 50° C steam-cracked resin feed as used in Example 5.

The properties of the pressure-sensitive adhesive formulations which were prepared are shown in the following Table 11.

TABLE 11
PRESSURE SENSITIVE ADHESIVES BASED ON KRATON OR CARIFLEX TR 1107

| RESIN SAMPLES | 19 | 20 |
|---|---|---|
| Resin pHR | 150 | 150 |
| 180° peel Strength grams/25mm | 3057 | 2967 |
| Polyken Tack grams | 1600 | 1600 |
| Tack Rolling Ball method cm | 5 | 5 |

EXAMPLE 12

Other block copolymers like styrene - butadiene rubbers (Shell Cariflex 1102 or Kraton) are not tackified by non aromatic low softening point aliphatic petroleum resins, whereas aromatic containing structures provide extremely good results.

Typical examples shown as follows should confirm that the combination of branched reactive olefins and aromatic monomers as petroleum resin feed additives ensures the manufacture of low softening point petroleum resins tackifying random and block styrene containing copolymers (SBR 1011, 1505, 1707, TR1102 &

1107). Other elastomers of similar structure can be tackified in the same way.

| Resin Sample | 7 | 9 | 13 | 14 | 15 | 16 |
|---|---|---|---|---|---|---|
| Resin pHR | 67 | 67 | 67 | 67 | 67 | 67 |
| 180° Peel strength grams/25 mm | 545 | 770 | 1450 | 1225 | 1460 | 590 |
| PolyKen tack grams | 0 | 0 | 900 | 1175 | 1100 | 0 |
| Tack Rolling Ball method - cm | >30 | >30 | 4.5 | 1.5 | 2 | 3 |
| Shear adhesion on paper hr to failure | 0 | 0 | >290 | 71 | >290 | 0 |

Typical results are shown in Tables 12 to 17.

TABLE 12
COMBINATION OF BRANCHED OLEFINS AND UNSATRUATED AROMATICS

| Resin Sample reference | 7 | 13 | 18 |
|---|---|---|---|
| Feed (wt %) | 50 | 50 | 50 |
| Solvent (benzene) (wt %) | 30 | 30 | 30 |
| Additive nature | U.O.P. Olefins | None | U.O.P. Olefins |
| Additive (wt %) | 20 | 0 | 10 |
| Aromatics nature | none | styrene | styrene |
| Aromatics (wt %) | 0 | 20 | 10 |
| Resin yield (wt %) | 31.3 | 49.5 | 35.4 |
| Oligomer yield (wt %) | 5.7 | 6.0 | 7.2 |
| Resin Gardner color (50 wt % in toluene) | 5− | 4− | 3.5 |
| Resin Gardner color after heating 16 hrs at 150° C | 13 | 12 | 12+ |
| Resin softening point ° C | 83 | 90 | 77 |

TABLE 13
PRESSURE SENSITIVE ADHESIVES (PSA's) BASED ON NATURAL RUBBER COMBINATION OF BRACHED OLEFINS AND UNSATURATED AROMATICS

| RESIN SAMPLES | 7 | 13 | 18 |
|---|---|---|---|
| Resin pHR | 100 | 100 | 100 |
| 180° Peel strength grams/25 min | 790 | 995 | 800 |
| Polyken tack grams | 800 | 900 | 850 |
| Tack Rolling Ball method cm | 2 | 2 | 2 |
| Shear adhesion on paper hr. | 1 | 1 | 1 |

TABLE 14
PSA 's BASED ON SBR 1011 COMBINATION OF BRANCHED OLEFINS AND UNSATURATED AROMATICS

| RESIN SAMPLES | 9 | 13 | 18 | 18 |
|---|---|---|---|---|
| Resin pHR | 67 | 67 | 67 | 100 |
| 180° Peel strength grams/25 mm | 725 | 1585 | 6230 | 5955 |
| Polyken Tack grams | 0 | 700 | 450 | 500 |
| Tack Rolling Ball method cm | >30 | 13 | >30 | >30 |
| Shear adhesion on paper hr. | | | | |

TABLE 15
PSA 's BASED ON SBR 1707 COMBINATION OF BRANCHED OLEFINS AND UNSATURATED AROMATICS

| RESIN SAMPLES | 7 | 13 | 18 | 18 |
|---|---|---|---|---|
| Resin pHR | 67 | 67 | 67 | 100 |
| 180° Peel Strength grams/25 mm | 1300 | 1400 | 1970 | 2358 |
| Polyken Tack grams | 650 | 700 | 700 | 600 |
| Tack Rolling Ball method cm | >30 | 3.5 | 4 | 25 |
| Shear adhesion on paper hr. | | | | |

TABLE 16
PSA 's BASED ON KRATON OR CARIFLEX TR 1102 COMBINATION OF BRANCHED OLEFINS AND UNSATURATED AROMATICS

| RESIN SAMPLES | 7 | 13 | 18 | 18 | 18 |
|---|---|---|---|---|---|
| Resin pHR | 67 | 67 | 67 | 100 | 150 |
| 180° Peel Strength grams/25 mm | 545 | 1450 | 1765 | 1855 | 2130 |
| Polyken Tack grams | 0 | 900 | 950 | 1150 | 900 |
| Tack Rolling Ball method cm | >30 | 4.5 | 4 | 5.5 | >30 |
| Shear on paper hr. | | | | | |

TABLE 17
PSA 's BASED ON KRATON OR CARIFLEX TR 1107 COMBINATION OF BRANCHED OLEFINS AND UNSATURATED AROMATICS

| RESIN SAMPLES | 7 | | 13 | | 18 | | | |
|---|---|---|---|---|---|---|---|---|
| Resin pHR | 67 | 100 | 67 | 100 | 67 | 100 | 150 | 233 |
| 180° Peel strength grams/25 mm | 1725 | 1970 | 1880 | 2310 | 1763 | 1970 | 2862 | 5175 |
| Polyken Tack grams | 850 | 1200 | 1100 | 1200 | 1000 | 1150 | 1500 | 1600 |
| Tack Rolling cm | 1 | 1.5 | 3 | 5.5 | 2 | 2 | 4 | >30 |
| Shear on paper hr. | | | | | | | | |

What is claimed is:

1. A process for preparing a low softening point resin useful as a tackifying agent for natural and synthetic rubbers which comprises polymerising using a Friedel Crafts catalyst
    (1) a petroleum resin feed comprising $C_5$ olefins and $C_5$ diolefins or a mixture of $C_5$ and $C_6$ olefins and diolefins, said feed being obtained from the cracking of petroleum feedstock and being subjected to thermal soaking at a temperature of 100° C. to 150° C., and adding to said feed
    (2) a branched chain aliphatic monoolefin transfer agent, in an amount of 10–400 wt. %, or a phenol or ether transfer agent, in an amount of 0.1 to 5 wt. %, based on the weight of petroleum resin feed, to obtain a resin of narrowed molecular weight distribution.

2. A process according to claim 1 wherein the petroleum feedstock has been cracked in the presence of steam.

3. A process according to claim 1 wherein the petroleum feedstock has been cracked at a temperature of between 500° and 870° C.

4. A process according to claim 3 wherein after cracking the feedstock is subjected to fractionation to remove $C_2$ to $C_4$ light ends.

5. A process according to claim 1 wherein the thermal soaking occurs at a temperature of 120° to 140° C.

6. A process according to claim 5 wherein the feed after thermal soaking is subjected to distillation to remove cyclic conjugated diolefins.

7. A process according to claim 1 wherein the feed additive is UOP olefins having a chain length of 5 to 9 carbon atoms per molecule prepared by oligomerisation of propylene with an acidic catalyst.

8. A process according to claim 1 wherein the feed additive is diisobutene.

9. A process according to claim 1 wherein the phenol is a mono-, di- or tri- substituted phenol, the substituent being a $C_1$ to $C_{30}$ hydrocarbyl group.

10. A process according to claim 1 wherein the ether is a dialkyl ether or an alkaryl ether, the alkyl group being a $C_1$ to $C_{30}$ hydrocarbyl group.

11. A process according to claim 1 wherein the polymerization mixture also contains a $C_8$ to $C_{10}$ unsaturated aromatic compound.

12. A process according to claim 11 wherein said aromatic compound is styrene, α-methyl styrene, vinyl toluene, indene, methyl indene or chlorostyrene.

13. A process according to claim 11 wherein the amount of aromatic compound is 10 to 400% by weight based on the weight of the petroleum resin feed.

14. A process according to claim 1 wherein branched chain aliphatic mono-olefins are added in an amount of 20 wt.% or higher based on the weight of petroleum resin feed.

15. A process according to claim 1 wherein the feed additive is branched chain mono-olefins produced in fluid catalytic cracking.

* * * * *